United States Patent [19]

Woolsey et al.

[11] Patent Number: 4,642,640

[45] Date of Patent: Feb. 10, 1987

[54] SIGNAL RECEPTOR-RERADIATOR AND SURVEILLANCE TAG USING THE SAME

[75] Inventors: Charles W. Woolsey, Deerfield Beach; Ezra D. Eskandry, Miami; George G. Pinneo, Ft. Lauderdale, all of Fla.

[73] Assignee: Sensormatic Electronics Corporation, Deerfield Beach, Fla.

[21] Appl. No.: 488,077

[22] Filed: Apr. 25, 1983

[51] Int. Cl.$^4$ .............................................. G01S 13/80
[52] U.S. Cl. .............................. 342/42; 343/6.5 SS; 340/572
[58] Field of Search .................. 343/6.5 SS, 700 MS, 343/6.8 R, 6.5 R; 340/572, 825.54

[56] References Cited

U.S. PATENT DOCUMENTS

| | | | |
|---|---|---|---|
| 3,859,652 | 1/1975 | Hall et al. | 340/572 |
| 3,895,368 | 7/1975 | Gordon et al. | 340/572 |
| 3,942,829 | 3/1976 | Humble et al. | 292/316 |
| 4,139,844 | 2/1979 | Reeder | 340/572 |
| 4,299,870 | 11/1981 | Humble | 428/101 |
| 4,331,957 | 5/1982 | Enander et al. | 343/6.8 R |
| 4,413,254 | 11/1983 | Pinneo et al. | 340/572 |

*Primary Examiner*—Thomas H. Tarcza
*Assistant Examiner*—Bernarr Earl Gregory

*Attorney, Agent, or Firm*—Robin, Blecker & Daley

[57] ABSTRACT

An improved receptor-reradiator, for use in a surveillance system employing a carrier frequency of UHF or higher in combination with a low frequency electrostatic field signal to be modulated on the carrier signal by the reradiator, is provided by an antenna frame wherein the metallic foil of which it is made is divided into three parts. The first part is U-shape of substantially one width and joins to a central portion of substantially reduced width which is predominantly inductive at the carrier frequency. A semiconductor diode, preferably a Schottky barrier diode or PIN switching diode, is connected in said central portion in series therewith. The opposite end of the central portion joins to an enlarged rectangular portion. At the low frequency the component has effectively two capacitive arms, one on each side of the diode, of different surface area to ensure bias signal for the diode. However, at the carrier frequency, the central portion has a high inductive reactance which, in conjunction with the inductive reactance of the U-shape portion, tunes to resonance the total capacitance of the component including that of the diode. The parts are proportioned such that the diode sees at the carrier frequency an inductance on one side and a capacitance on the other side.

7 Claims, 16 Drawing Figures

U.S. Patent  Feb. 10, 1987  Sheet 1 of 3  4,642,640
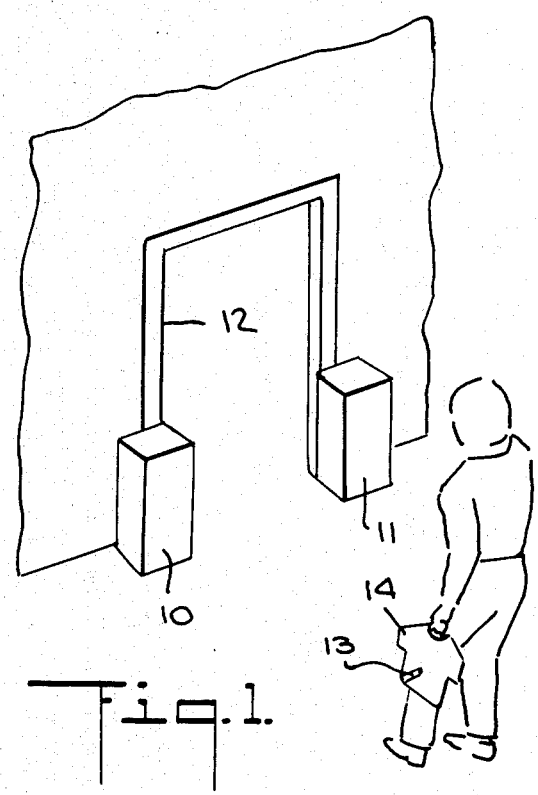
Fig.1.
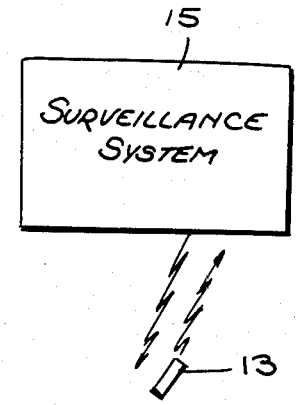
Fig.2.
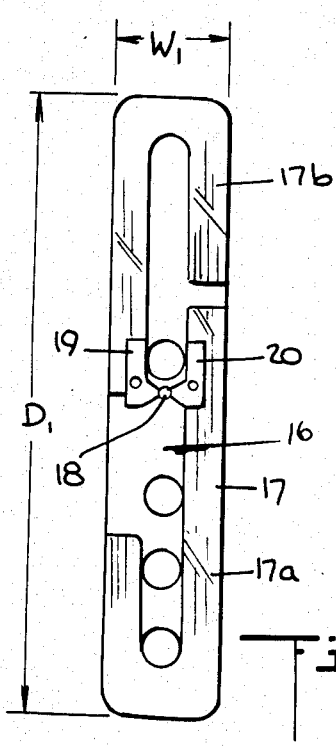
Fig.3.
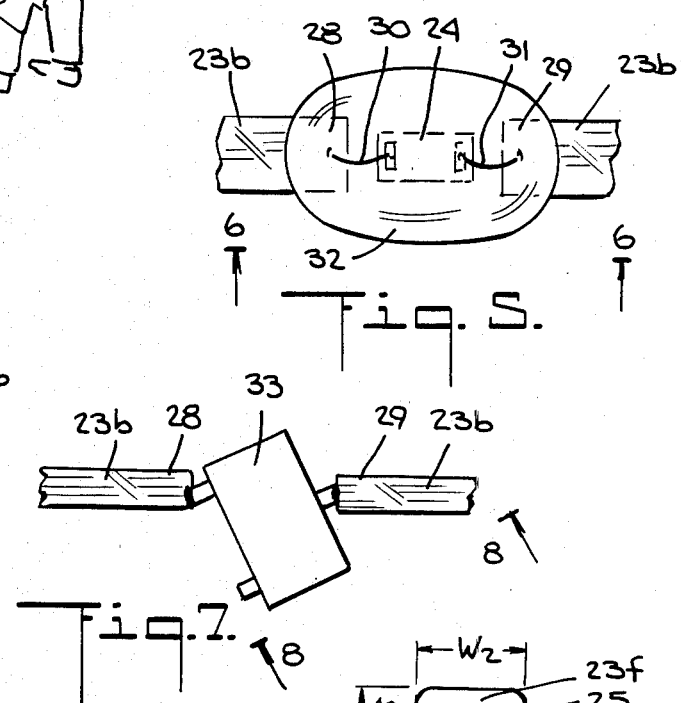
Fig.5.
Fig.7.
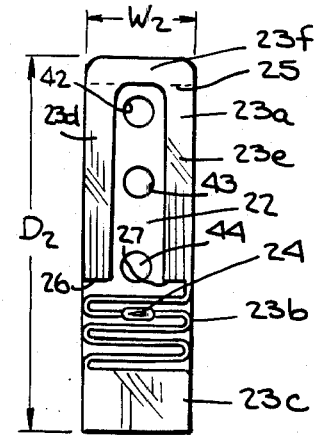
Fig.4.

SIGNAL RECEPTOR-RERADIATOR AND SURVEILLANCE TAG USING THE SAME

BACKGROUND OF THE INVENTION

The present invention relates to a telltale element adapted to be secured to an article to be maintained under surveillance.

In U.S. Pat. No. 3,895,368, issued July 15, 1975, for "Surveillance System and Method Utilizing Both Electrostatic and Electromagnetic Fields" and assigned to the same assignee as the present application, there is described a system wherein a microwave signal generator projects an electromagnetic wave into a space under surveillance to establish a first field. A pulse or frequency modulated low frequency generator is used to apply a voltage to a discontinuous conductor for establishing a second field, electrostatic in nature, throughout the space. Presence in the space of a miniature passive electromagnetic wave receptor-reradiator in the form of a semiconductive diode connected to a dipole antenna causes the reradiation of a low frequency component modulated on a microwave component as a carrier. The front end of a receiver system is tuned to the microwave frequency and feeds a suitable detector circuit responsive to the low frequency signal. A coincidence circuit energizes an alarm circuit whenever the detected signal coincides with the original modulation envelope being applied to the low frequency generator.

In U.S. Pat. No. 4,139,844, issued Feb. 13, 1979, for "Surveillance Method and System with Electromagnetic Carrier and Plural Range Limiting Signals" and assigned to the same assignee as the present application, there is described an improved surveillance system wherein two low frequency signals are radiated into the surveillance field from opposite sides to limit the field size in addition to the microwave carrier signal transmitted throughout such field. The miniature receptor-reradiator responds to the signals when in the field to return a modulated carrier signal to a receiver device for actuating an alarm. The alarm is actuated only when the receiver detects a signal having a carrier component corresponding to the microwave signal with sideband components corresponding to the sum of the frequencies of the two low frequency signals.

Reusable security tags adapted to operate in the foregoing systems have been disclosed and claimed in U.S. Pat. No. 3,942,829, issued Mar. 9, 1976, entitled "Reusable Security Tag" and U.S. Pat. No. 4,299,870, issued Nov. 10, 1981, entitled "Reusable Theft Deterrent Security Tag", both of which are assigned to the same assignee as the present invention. Such patents disclose the construction of enclosures or housings for the telltale element providing for the fastening of such elements to garments or similar articles of merchandise. Thus, in U.S. Pat. No. 3,942,829 there is disclosed a reusable security tag having an enclosure containing an element detectable by independent means and a cruciate sheet metal clutch lock. A pin for piercing a garment is secured at the end of a lever arm which is hinged to said enclosure for controlled movement into said lock. Said pin is released from said clutch lock by application of a special tool to said enclosure for deforming the clutch to spread its jaws. U.S. Pat. No. 4,299,870 discloses an improved construction of the enclosure.

The enclosure disclosed in U.S. Pat. No. 3,942,829 had an overall length of approximately 4½ inches and a width of about 1 7/32 inches. The improved enclosure disclosed and claimed in U.S. Pat. No. 4,299,870 effected a slight reduction in size having an overall length of about 4 3/16 inches and a width throughout most of its length of about ⅞ inches. Reference to the last mentioned patent will reveal that the enclosure had a pair of opposing wings to be engaged by a releasing tool which wings increased the width of the enclosure to about 1 1/16 inches. While such tags have served admirably in actual use, there has developed a need for a smaller lighter weight tag and it is to that end that the present invention addresses itself.

SUMMARY OF THE INVENTION

In accordance with one aspect of the present invention there is provided a signal receptor-reradiator component for operation in a surveillance system, said component comprising in combination an antenna frame and a semiconductor small-signal diode, said antenna frame being formed of electrically conductive material having a first end portion effective as an antenna with an inductive reactance at the carrier frequency at which it is intended to operate in the UHF or higher frequency region and having sufficient surface area to function as a capacitive reactance at frequencies up to at least 100 KHz, a central portion of serpentine configuration having a sufficiently small cross-section along its length that said central portion behaves as an inductor at said carrier frequency, and a second end portion having a surface area less than said surface area of said first portion and configured to behave as a capacitor at frequencies up to at least said carrier frequency, said diode being connected in said central portion in series therewith.

In accordance with a further aspect of the present invention there is provided a surveillance tag for preventing unauthorized transport of articles beyond a surveillance region, said tag comprising in combination a signal receptor-reradiator component as defined above and a plastic housing enclosing and concealing said component, said housing confining a clutch lock therein for receiving and securing a separate tack therein until released by application of a tool to the housing.

BRIEF DESCRIPTION OF THE DRAWINGS

The invention will be better understood after reading the following detailed description of the presently preferred embodiments thereof with reference to the accompanying drawings in which:

FIG. 1 is an illustration of a known surveillance system installation with pedestals on either side of a doorway and showing an individual carrying a garment with a security tag attached thereto;

FIG. 2 is a simplified block diagram of the known surveillance system;

FIG. 3 is a top plan view of the prior art receptor-reradiator component with the top covering layer of paper removed to show the internal construction;

FIG. 4 is a view similar to FIG. 3 illustrating the receptor-reradiator constructed in accordance with the present invention;

FIG. 5 is an enlarged fragmentary detailed view of a portion of the component of FIG. 4;

FIG. 7 is a view similar to that of FIG. 5 but showing an alternative diode assembly;

3

Figure 8:
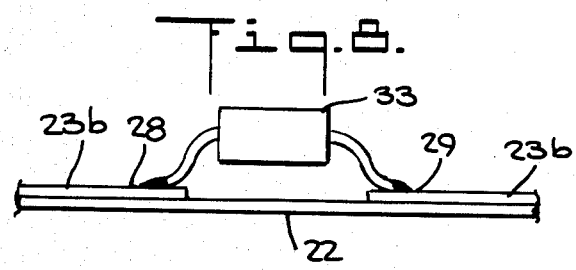
Figure 9:
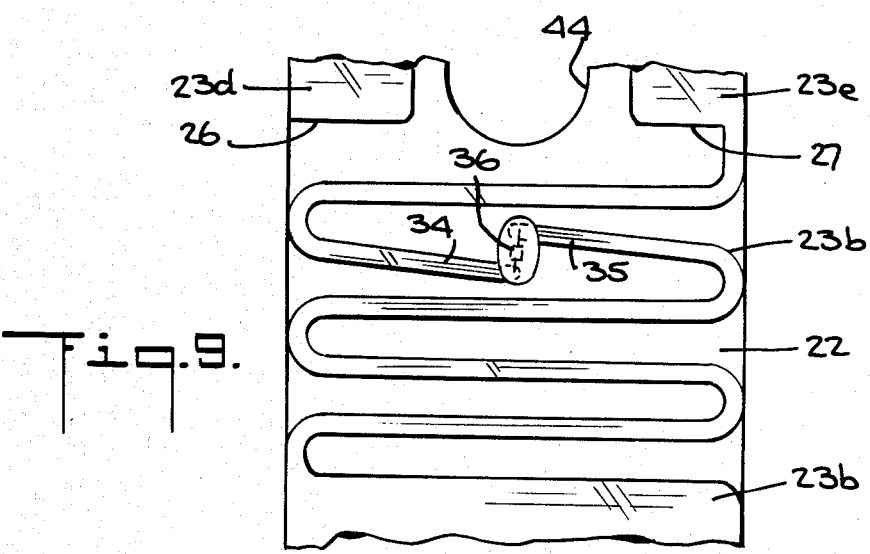
Figure 10:
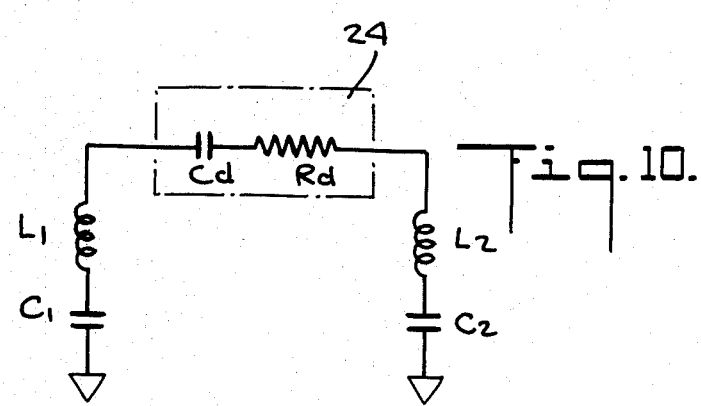
Figure 11:
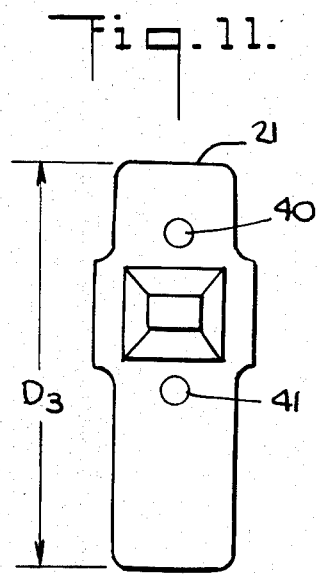
Figure 14:
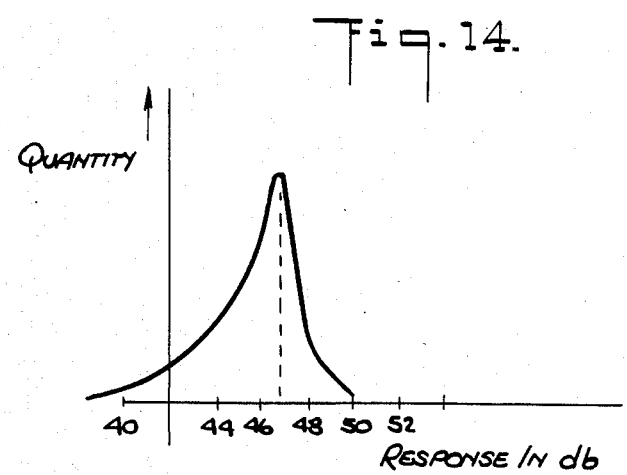
Figure 12:
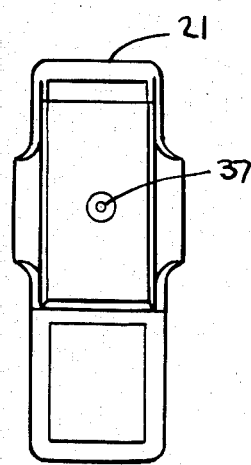
Figure 15:
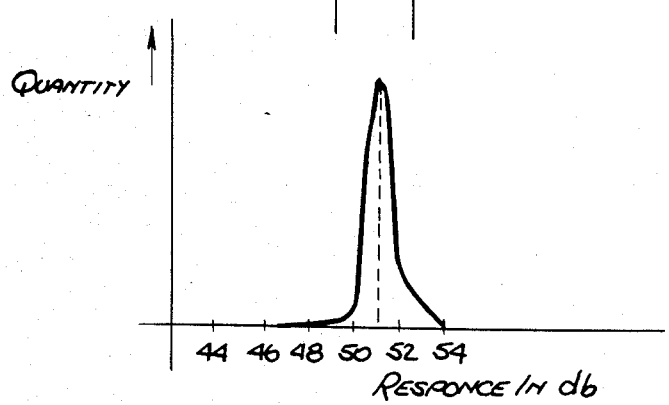
Figure 13:
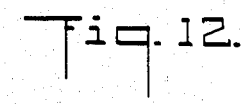
Figure 16:
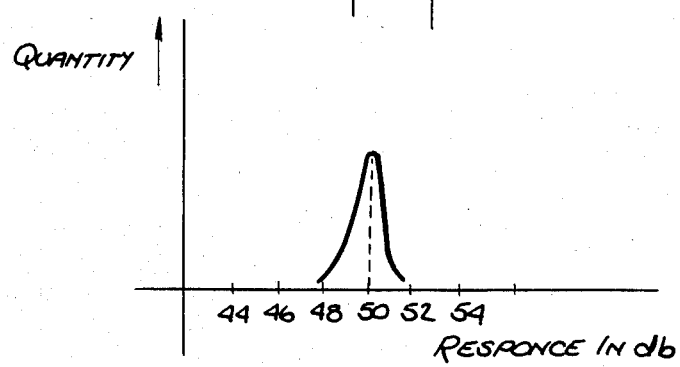

FIG. 8 is an elevational view taken in the direction of the line 8—8 in FIG. 7;

FIG. 9 is an enlarged fragmentary view of a portion of a receptor-reradiator constructed in accordance with the present invention and illustrating a modification of the embodiment of FIG. 4;

FIG. 10 is an electrical schematic of an equivalent circuit for explaining the parameters of the embodiments of FIGS. 4 and 9;

FIG. 11 is a top plan view of an enclosure for concealing a clutch lock along with the component of FIG. 4 or FIG. 9;

FIG. 12 is a bottom plan view of the housing of FIG. 11;

FIG. 13 is a perspective view of a tack for use in cooperation with the housing illustrated in FIGS. 11 and 12;

FIG. 14 is a curve showing the relative response of a sample lot of tags constructed as shown in FIG. 3;

FIG. 15 is a curve showing the relative response of a sample lot of tags constructed as shown in FIG. 4; and FIG. 16 is a curve showing the relative response of a sample lot of tags constructed as shown in FIG. 4 but enclosed within the housing of FIGS. 11 and 12.

The same reference numerals are used throughout the drawings to designate the same or similar parts.

DESCRIPTION OF THE PREFERRED EMBODIMENTS

Referring now to FIGS. 1 and 2, there is shown a typical surveillance installation of the type disclosed in U.S. Pat. No. 3,895,368. Such installation consists of a pair of pedestals, 10 and 11, disposed on opposite sides of a doorway, 12, and arranged to provide an alarm signal whenever a telltale tag, such as the tag 13 attached to a garment 14, is brought within range. The tag, to be described hereinafter, has a semiconductor diode connected to antenna elements for mixing a low frequency electrostatic field signal with a microwave electromagnetic carrier signal, both emanating from a source, 15. The tag returns the so modulated carrier back to the source where it is detected by a suitable receiver. As used herein the term "microwave" includes UHF and higher frequencies.

The details of the portal equipment for establishing the surveillance screen constitute no part of the present invention and need not be described further. Reference may be had to the aforementioned patents for further details and to U.S. Pat. No. 4,281,321, issued July 28, 1981, for "Surveillance System Employing A Floor Mat Radiator," assigned to the same assignee as the present invention.

Each of the systems described in U.S. Pat. Nos. 3,895,368; 4,139,844 and 4,281,321 has in common the use of a microwave radiated carrier signal and the establishment of a relatively low frequency electrostatic field signal. Both the prior art tags and those constructed in accordance with the present invention are intended to operate with all of said patented systems. Because of the use of an electrostatic field, such patented systems may conveniently be referred to as "E-field" systems, and such appellation will be applied herein in a generic sense unless the context indicates otherwise.

The details in construction of a tag in wide current use are shown in FIG. 3. Such tag generally consists of a paper substrate 16 to which is laminated a layer of conductive metallic foil 17 that has been patterned by die cutting to produce an antenna frame having two arms, 17a and 17b. At approximately the middle of the dipole produced by the arms 17a and 17b there is located in bridging fashion a junction type semiconductor diode 18 bonded to terminals 19 and 20 that are, in turn, bonded to and over the arms 17a and 17b in electrically conductive engagement with the latter. A covering layer of paper stock normally is laminated over the assembly as seen in FIG. 3 to protect and conceal the components 17-20, but such cover layer has been omitted in the drawings in order to show the internal details.

Tags of the type shown in FIG. 3 have been used as "soft tags" by securing them directly to the articles to be protected. Such tags have also been concealed and protected within enclosures of the type shown in the aforementioned U.S. Pat. Nos. 3,942,829, and 4,299,870. The tags of FIG. 3 are larger than necessary, having a length $D_1 = 4.0$ inches and a width $W_1 = 0.75$ inches. Thus the tag area measures 3 square inches. When installed in the enclosures of either of the two last mentioned patents, the overall size of the tag becomes even larger. As such, particularly on light weight merchandise, the tags are a considerable annoyance to the prospective customer.

Another problem encountered with existing tags is that they tend to be detuned easily when brought near to other objects causing a shift in resonant frequency and a drop in efficiency. The antenna frame shown in FIG. 3 is not designed to capture efficiently both the electrostatic and electromagnetic fields, nor does it include any provision for isolating the diode 18 and antenna from nearby objects.

The present invention provides a significant improvement over the existing tags. Thus, the tag shown in detail in FIG. 4, when housed in the enclosure shown in FIGS. 11 and 12, measures less than 2.75 square inches and closer to about 2.6 square inches. The embodiment shown in FIG. 4 has a length $D_2$ equal to about 2.45 inches and a width $W_2$ of about 0.75 inches for a total area of about 1.8375 square inches. The length $D_3$ of the housing 21 in FIGS. 11 and 12 is about 2 11/16 inches with the narrowest width equal to about 29/32 inches.

Referring to FIG. 4, the general construction is similar to the existing tag in that there is a paper stock substrate 22 to which is laminated the die cut antenna frame elements of copper or aluminum foil or the like consisting of a first end portion 23a dimensioned and shaped to have an inductive reactance at the carrier frequency at which it is intended to operate in the UHF or higher frequency region. For domestic operation a carrier frequency of 915 MHz is preferred, while a frequency of 2450 MHz is generally used in Europe. The end portion 23a, effectively inductive with respect to the 915 MHz carrier, has been found to function with acceptable sensitivity at 2450 MHz without changing the length of the portion 23a. In addition, the portion 23a is caused to have as large a surface area as possible within the limitations of the need to function as an antenna and the other geometric constraints to be mentioned, so that portion 23a will appear as a capacitive reactance at frequencies up to at least 100 KHz.

Joined to the end portion 23a is a central portion 23b of serpentine configuration having a sufficiently small cross-section along its length that said central portion behaves as an inductor at the microwave carrier frequency. A suitable transverse dimension for the strip making up the central portion is about 0.031 inches. Next, joined to the central portion 23b, is a second end portion 23c having a surface area less than the total surface area of the first portion, 23a. The portion 23c is configured to behave as a capacitor at frequencies up to at least the carrier frequency. Finally, a semiconductor small-signal diode 24 is connected in the central portion 23b in series therewith, as shown. The diode is presently preferred to be selected from the group consisting of Schottky barrier diodes and PIN switching diodes. However, it is believed that any diode having comparable signal mixing efficiency at the operating frequencies will benefit from use of the antenna frames disclosed herein.

In an embodiment that has been fabricated and tested with results superior to that of the prior tag of FIG. 3, the portion 23c measured approximately 0.39×0.75 inches. The portion 23a, of U-shape, had arms 23d and 23e approximately 0.195 inches wide and 1.31 inches long between the broken line 25 and the ends 26 and 27, respectively. The measurement of the end section 23f above the broken line 25 was about 0.17×0.75 inches. Thus, the cumulative surface area of the entire portion 23a was about 0.6384 square inches, while the area of portion 23c was about 0.2925 square inches.

Figure 6:
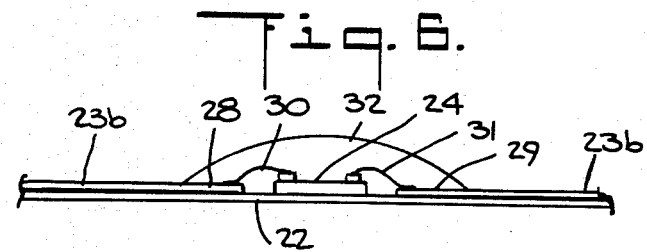
FIG. 6 is a side elevational view taken along the line 6—6 in FIG. 5.

Preferably, a chip embodiment of either a Schottky diode or a PIN switching diode is employed, in which case it can be die-bonded by a suitable adhesive such as an epoxy to the substrate 22, and attached by wire bonding, using, for example, 1 mil wire compatible with the foil constituting the antenna frame, to the spaced apart ends 28 and 29 of sections of the central portion 23b. See the wires 30 and 31 in the enlarged illustrations of FIGS. 5 and 6. The chip 24 and wire connections 30 and 31 are encapsulated in a drop, 32, of an epoxy encapsulant.

Satisfactory results have been obtained using for diode 24 a Motorola silicon hot-carrier diode (a Schottky diode) device No. MMBD501 available in an SOT 23 configuration. An example of this is illustrated in FIGS. 7 and 8 with the diode 33 having its anode and cathode terminals connected to the ends 28 and 29 of the frame portion 23b, as shown.

Satisfactory results have also been obtained with an ITT Schottky barrier diode type SD 101A. This is interchangeable with JEDEC diode 1N6263. Also, very good results are obtained with a ROHM Corporation mini-glass band-switch diode, No. 1SS216 (believed to be of PIN construction).

In FIGS. 4 and 5, the diode chip 24 is rectangular with its long axis positioned parallel to the short sides of the receptor-reradiator. To accommodate this orientation it will be observed that the ends 28 and 29 of the frame portion 23b are disposed facing each other longitudinally aligned with a gap therebetween. However, it may be advantageous from consideration of manufacturing constraints to modify portion 23b as shown in FIG. 9. As seen therein, the serpentine portion 23b has ends 34 and 35 that are offset relative to each other providing a gap therebetween for accommodating a diode 36 with its long axis lying parallel to the long sides of the antenna frame. In all other respects the embodiment of FIG. 9 can be the same as that shown and described with reference to FIG. 4.

Referring to FIG. 4, the serpentine portion 23b and the location of diode 24 therein is chosen such that the inductance provided by portion 23b, when added to the inductance provided by portion 23a, tunes the total capacity of the tag as constituted both by the diode and the antenna frame components substantially to resonance at the microwave carrier frequency. Actually, the entire antenna frame with its assembled diode can be visualized as made up of a series of inductances and capacitances. This can best be explained by reference to FIG. 10. The diode, as is well-known, can be represented by a resistance $R_d$ in series with a capacitance $C_d$. The U-shaped end portion 23a and the short piece of the serpentine portion 23b that connects portion 23a to the diode can be represented by an inductance $L_1$ in series with a capacitance $C_1$. On the other side of the diode the remainder of portion 23b plus end portion 23c can be represented by an inductance $L_2$ in series with a capacitance $C_2$. As mentioned above, the values of L and C on either side of the diode are adjusted so that the reactances, including that of the diode, sum to zero at the intended carrier frequency. In the present example the design frequency is 915 MHz.

In order to maximize coupling to the 100 KHz electrostatic field, the surface areas of portions 23a and 23c are made as large as practical while ensuring that $C_1 \neq C_2$. In this example $C_1 > C_2$ and represents the presently preferred relationship. At the relatively low frequency of 100 KHz, the reactance of $L_1$ and $L_2$ will be very small. However, at the carrier frequency the inductive reactance provided by the serpentine portion 23b will be substantial and will function both to aid in tuning the component to resonance in addition to decoupling the diode from the capacitances represented by portions 23a and 23c.

Referring now to FIGS. 11, 12 and 13, it will be seen that the housing 21 has at 37 an aperture through which the shank 38 of a tack 39 can be passed to interact with a concealed clutch lock. For details of construction, reference can be made to the aforesaid U.S. Pat. No. 4,299,870 wherein the resemblance between arm 12 of the patent and the enclosure 21 herein should be readily apparent. FIGS. 8, 9, 10 and 12 of the patent show the internal construction. Particular attention is invited in the patent to the bosses 25 and 26 within the housing that underlie the dimples 34 and 35. In FIG. 11 of the present application the dimples are shown at 40 and 41. The dimples lie on either side of the aperture 37. It is to accommodate the bosses, not shown in the drawings herein, and the passage of tack shank 38 that the tag in FIG. 4 is provided with the three apertures 42, 43 and 44 through the substrate 22.

Given that $D_2 = 2.45$ inches and $W_2 = 0.75$ inches the ratio of length to width is 3.267. A slightly smaller tag was constructed and tested satisfactorily. In the smaller embodiment the width $W_2$ was about 0.64 inches while the length $D_2$ remained the same. Thus, the ratio of length to width was 3.828. The end portion 23c measured 0.39×0.64 inches for an area of 0.249 square inches. The U-shape portion had arms 0.14×1.31 inches while the end portion 23f measured 0.17×0.64 inches. Thus, the surface area of the portion 23a in the smaller embodiment was 0.4756 square inches.

By way of contrast, the length to width ratio of the tag of FIG. 3 was 5.333.

While copper foil can be used for the frame portions 23a, 23b and 23c, in which case copper wire would be used for wire bonding the diode, it is presently preferred to use aluminum foil with aluminum wire.

Summarizing, the present tag is provided with relatively large conductive surfaces to couple to the electrostatic field, and with a matching network interconnecting the large surfaces with the diode. In FIGS. 4 and 9, the serpentine sections on either side of the diode perform this function. The area of the U-shape end portion is made deliberately unequal to the area of the rectangular end portion to ensure that $C_1 \neq C_2$ and that there is provided adequate bias for the diode. Even if the tag is oriented parallel to an equipotential line in the interrogation field there will be an imbalance developing a bias across the diode.

The reactive impedance of the overall tag, as mentioned above, should be zero. However, insofar as the diode is concerned, it should see at the carrier frequency capacitance on one side and inductance on the other. In that way the diode will be at the effective center of a resonant tank circuit where the current is maximized.

Considered from another point of view, the receptor-reradiator illustrated in FIGS. 4 and 9 has an antenna frame in which, commencing at the end 26, there is provided from that end to the bottom edge of the portion 23c, as seen in FIG. 4, a continuous conductive path except for the gap located in the central portion 23b across which is connected the diode 24 or 36. Starting at 26 the path has a first width that remains substantially constant for a first distance over portions 23d, 23f and 23e. While in the specific example, portion 23f is slightly narrower, the difference is only slight. At the end of portion 23e, at end 27, the path narrows substantially to a second width substantially less than the first width and continues with substantially the second width past the gap (at ends 28 and 29 in FIG. 4 or 34 and 35 in FIG. 9) and for a distance beyond such gap which distance exceeds the distance covered by the second width, i.e., the narrow width, preceding such gap, whereupon the path widens again into the portion 23c and continues thus widened to the end of the path. The widened region provides an enlarged portion, the portion 23c, no transverse dimension of which is as small as the first width, and which has a surface area different from the surface area of the path that extends over the first distance. Finally, the path is folded so as to be wholly contained within an outer boundary that encircles an area of no more than 2 square inches.

It is difficult to provide an absolute measure of the efficiency of the subject tags. However, it is possible to provide comparative data. Using a carefully controlled test set-up for subjecting each tag to the type field that will be encountered in practice with an E-field system and measuring the response level it is possible to derive a plot based upon the number of tags providing a given level of response. The response will, to a great extent, be influenced by the modulation efficiency of the particular diode which, in turn, is effected by the efficiency of the antenna frame. Using this statistical approach it was found that a significant sample of tags constructed as shown in FIG. 3 yielded a response as shown in FIG. 14 where the peak occurs at about 47 db with at least 10% of production falling below 40 db and considered unusable.

Applying the same test to a significant sample of tags constructed in accordance with FIG. 4 yielded a response curve as shown in FIG. 15 with a peak at about 51 db and essentially all the samples above 46 db.

When the tags are placed within the enclosure of FIGS. 11 and 12, there is a slight loss in response, presumably due to the presence of the metal clutch lock. See the U.S. Pat. No. 4,299,870 for details. A typical response cross-section is shown in FIG. 16 where the peak has dropped to about 50 db.

Having described the present invention with reference to the presently preferred embodiments thereof, it should be apparent to those skilled in the subject art that various changes in construction can be effected without departing from the true spirit of the invention as defined in the appended claims.

What is claimed is:

1. A signal receptor-reradiator component for operation in a surveillance system, said component comprising in combination an antenna frame and a semiconductor small-signal diode, said antenna frame being formed of electrically conductive material providing from a first end to a second end a continuous conductive path except for a gap located at an intermediate point across which is connected said diode, said path commencing at said first end having a first width that remains substantially constant for a first distance, whereupon said path narrows substantially to a second width substantially less than said first width and continues with substantially said second width past said gap and for a distance beyond said gap exceeding the distance covered by said second width preceding said gap, whereupon said path widens again and continues thus widened to said second end to provide an enlarged portion having a surface area different from the surface area of the path over said first distance and having no transverse dimension as small as said first width, said path being folded to be wholly contained within an outer boundary that encircles an area of no more than 2 square inches.

2. A signal receptor-reradiator component according to claim 1, wherein said path is U-shape over said first distance, is serpentine throughout the distance it has said second width, and said enlarged portion is substantially rectangular.

3. A tag device for use in a surveillance system for receipt of a first high frequency signal and a second lower frequency signal transmitted by such system, said device comprising first and second circuit elements of respective different receptivity of such first and second transmitted signals, said first and second circuit elements being physically mutually separate and of respective different geometries and having respective fixed inductive and capacitive reactances at both said first and second frequencies and a third circuit element having capacitive reactance and electrically series-connected with said first and second elements, the sum of said first and second circuit element reactances and said third circuit element reactance providing a resonant electrical circuit at said first frequency, said tag device further including a generally rectangular substrate supporting said first, second and third elements, said first circuit element comprising first and second portions at respective lengthwise spaced locations on said substrate.

4. The invention claimed in claim 3 wherein said second circuit element comprises first and second parts respectively continuous with said first and second portions of said first circuit element.

5. The invention claimed in claim 4 wherein said first and second portions of said first circuit element are of substantially greater extent widthwise of said substrate than are said first and second parts of said second circuit element.

6. The invention claimed in claim 5 wherein said tag device defines an electrical series circuit comprising in sequence said first portion of said first circuit element, said first part of said second circuit element, said third circuit element, said second part of said second circuit element and said second portion of said first circuit element.

7. The invention claimed in claim 6 wherein said third circuit element is a diode.

* * * * *